(12) United States Patent
Partovi (10) Patent No.: US 12,375,503 B2
(45) Date of Patent: Jul. 29, 2025

(54) EXPLOIT PREDICTIVE INTRUSION PROTECTION SYSTEM (EP-IPS) FOR DATA PACKET TRAFFIC ON DATA COMMUNICATION NETWORKS

(71) Applicant: Fortinet, Inc., Sunnyvale, CA (US)

(72) Inventor: Roshanak Partovi, Valbonne (FR)

(73) Assignee: Fortnet, Inc., Sunnyvale, CA (US)

( * ) Notice: Subject to any disclaimer, the term of this patent is extended or adjusted under 35 U.S.C. 154(b) by 433 days.

(21) Appl. No.: 17/710,632

(22) Filed: Mar. 31, 2022

(65) Prior Publication Data

US 2023/0319066 A1    Oct. 5, 2023

(51) Int. Cl.
*H04L 9/40* (2022.01)

(52) U.S. Cl.
CPC ...... *H04L 63/1416* (2013.01); *H04L 63/0209* (2013.01); *H04L 63/1433* (2013.01); *H04L 63/20* (2013.01)

(58) Field of Classification Search
CPC ............. H04L 63/1416; H04L 63/0209; H04L 63/1433; H04L 63/20
See application file for complete search history.

(56) References Cited

U.S. PATENT DOCUMENTS

| | | | | |
|---|---|---|---|---|
| 9,306,974 B1 * | 4/2016 | Aziz | ............... | H04L 63/1491 |
| 10,873,595 B1 * | 12/2020 | Oliphant | ............... | G06F 21/50 |
| 10,873,597 B1 * | 12/2020 | Mehra | ............... | H04L 41/147 |
| 11,363,041 B2 * | 6/2022 | Paquin | ............... | G06F 40/35 |
| 2003/0154399 A1 * | 8/2003 | Zuk | ............... | H04L 63/1416 726/11 |
| 2003/0204632 A1 * | 10/2003 | Willebeek-LeMair | ............... | H04L 63/1433 709/249 |
| 2004/0073800 A1 * | 4/2004 | Shah | ............... | G06F 21/577 713/176 |
| 2015/0033340 A1 * | 1/2015 | Giokas | ............... | H04L 63/1433 726/23 |
| 2015/0271193 A1 * | 9/2015 | Estes | ............... | H04L 63/1416 726/23 |
| 2021/0097174 A1 * | 4/2021 | Mandal | ............... | G06F 21/554 |
| 2022/0124114 A1 * | 4/2022 | Assiry | ............... | H04L 63/10 |

OTHER PUBLICATIONS

Joseph R. Rose et al., Intrusion Detection using Network Traffic Profiling and Machine Learning for IoT, IEEE (Year: 2021).*
Yeu-Pong Lai et al., Using the vulnerability information of computer systems to improve the network security, Elsevier B.V. (Year: 2007).*

* cited by examiner

*Primary Examiner* — Shanto Abedin
(74) *Attorney, Agent, or Firm* — Law Office of Dorian Cartwright; Dorian Cartwright (57) ABSTRACT

An exploit probability value is calculated for each of the plurality of signatures learned from a history of exploits against attributes. The exploit probability value represents a likelihood of a particular signature exploiting one or more attributes of the private network. The exploit probability value is sorted or ranked to prioritize which exploit signatures have the highest probability of occurrence. Only a predetermined number of selected exploit signatures with the highest probabilities are scanned in real-time for signature matching.

5 Claims, 6 Drawing Sheets

EXPLOIT PREDICTIVE INTRUSION PROTECTION SYSTEM (EP-IPS) FOR DATA PACKET TRAFFIC ON DATA COMMUNICATION NETWORKS

FIELD OF THE INVENTION

The invention relates generally to computer networking, and more specifically, for an intrusion prevention system (IPS) to scan data packets from a data communication network using risk-based selection of exploit signatures based on a vulnerability assessment of a private network.

BACKGROUND

Private networks use IPS to analyze data packets to protect themselves from malicious network traffic causing damage. For example, a hash-based signature of an incoming data packet(s) is compared against a database of known malicious signatures. Whenever a match is found, the data packet, and subsequent related data packets, can be blocked.

It is important for customers to minimize the number of IPS false positives, while maximizing coverage. Many network administrators are wary about using new signatures without testing them in advance due to the potentiality of false positives, or normal activity mistakenly identified as an attack). Some customers even avoid using IPS altogether because of false positives. This is because in the event of a false positive (normal activity mistakenly identified as an attack), IPS will actively stop the normal activity which is likely to negatively impact business functions. False positives cost manpower and time to address, and also divert the attention from dealing with real threats.

Therefore, what is needed is a robust technique for intrusion prevention with risk-based selection of exploit signature based on a vulnerability assessment of a private network. Selected exploit signatures can be prioritized for security action processing.

SUMMARY

These shortcomings are addressed by the present disclosure of methods, computer program products, and systems for intrusion prevention with risk-based selection of exploit signature based on a vulnerability assessment of a private network.

In one embodiment, a plurality of exploit signatures is stored. Threat sensitivity levels are assigned for the plurality of signatures based on a use context of the private network. Attributes of network devices on a private network are identified, and vulnerabilities associated with the attributes are identified.

In another embodiment, an exploit probability value is calculated for each of the plurality of signatures learned from a history of exploits against attributes. The exploit probability value represents a likelihood of a particular signature exploiting one or more attributes of the private network. The exploit probability value can be sorted or ranked to prioritize which exploit signatures have the highest probability of occurrence. Only a predetermined number of selected exploit signatures with the highest probabilities are scanned.

In still another embodiment, real-time network packets received from the data communication network are scanned, prior to forwarding to a particular network device on the private network, for comparing network packets against signatures of the signature database. The intrusion prevention module avoids blocking network packets that may exploit a vulnerability of an attribute based on the exploit probability value and the sensitivity level being below the threshold. based on the exploit probability value and the sensitivity level being above the threshold. Unblocked potential exploits are tagged and exploited.

Advantageously, network performance is improved with better network security. Additionally, computer performance is improved with more efficient threat scanning. A greater coverage area for threats is achieved with reduced processing.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for intrusion prevention with risk-based selection of exploit signature based on a vulnerability assessment of a private network.

One of ordinary skill in the art will recognize many additional variations made possible by the succinct description of techniques below.

Figure 2:
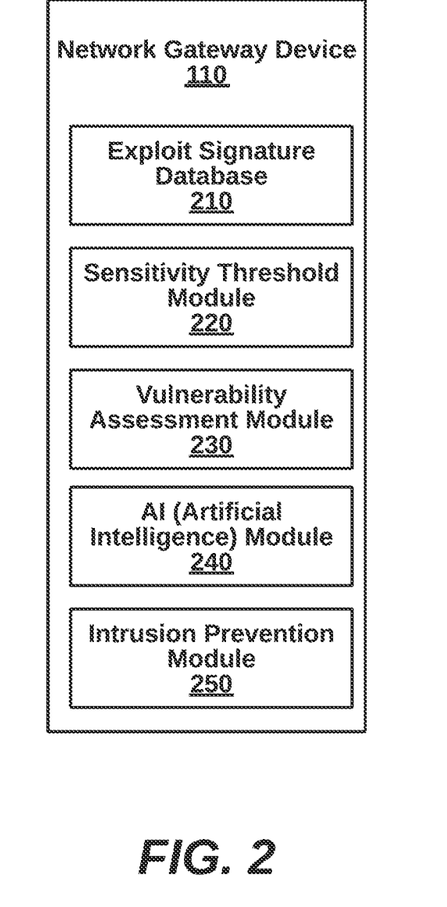
FIG. 2 is a more detailed block diagram illustrating an exploit prioritizing module of the system of FIG. 1, according to an embodiment.
Figure 3A:
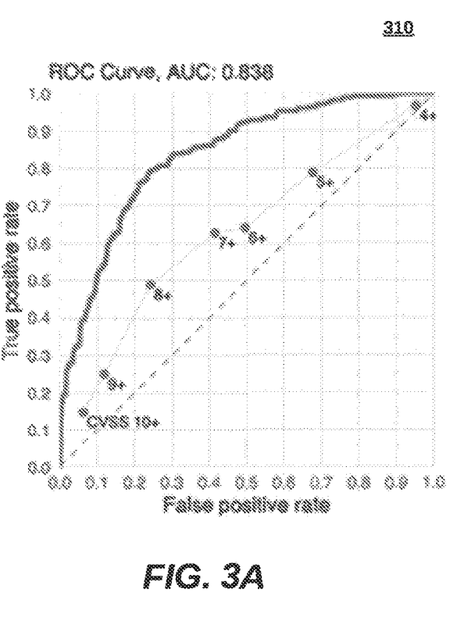
FIGS. 3A & 3B demonstrates efficiency of the system of FIG. 1 versus a prior art common vulnerability scoring system (CVSS), according to an embodiment.
Figure 3B:
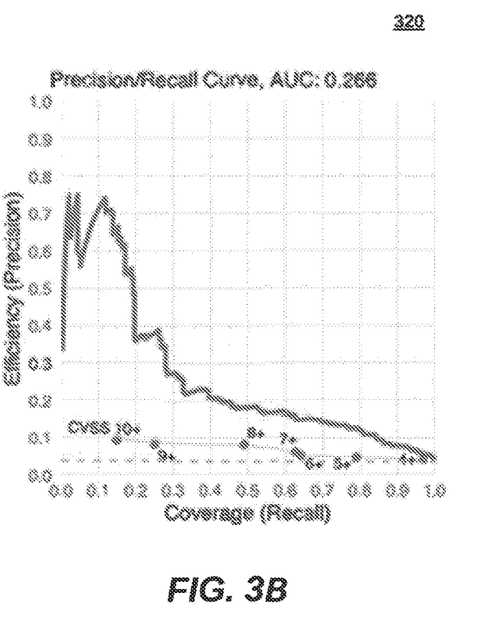

I. Systems for Risk-Based Intrusion Protection (FIGS. 1-3)

Figure 1:
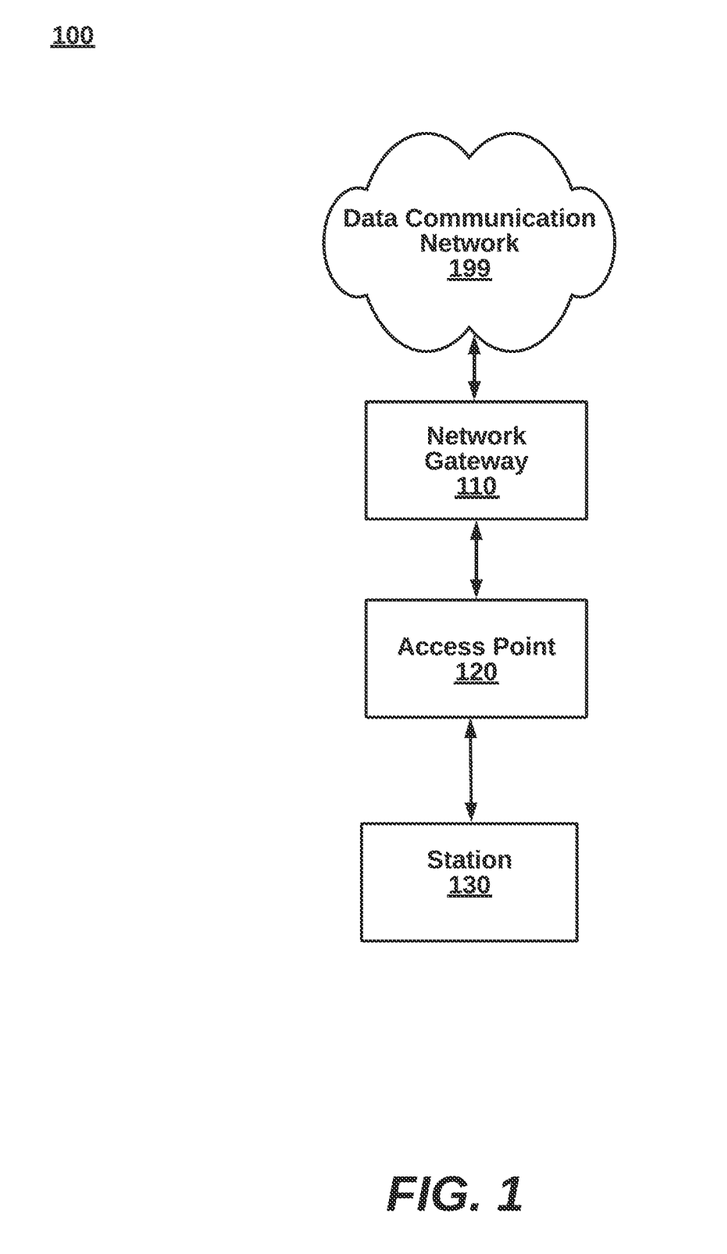
FIG. 1 is a block diagram illustrating a system for intrusion prevention with risk-based selection of exploit signature based on a vulnerability assessment of a private network, according to an embodiment.

FIG. 1 is a block diagram illustrating a system 100 for risk-based selection of exploit signature based on a vulnerability assessment of a private network, according to an embodiment. The system 100 includes a network gateway 110, an access point 120, and a station 130, coupled to a data communication network 199. Many other configurations are possible, for example, with additional network components such routers, switches, repeaters, firewalls, and the like. Also, there can be many more or fewer clients in FIG. 1. The system components can be implemented in computer devices with non-transitory source code, such as set forth below with reference to FIG. 6.

The components of the system 100 are coupled in communication over the data communication network. The components can be connected to the data communication system via hard wire. The data communication network 199 can be any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802,11r, and the like.

The network gateway 110 selects priority exploit signatures for real-time scanning. In one embodiment, an exploit predictive scoring system ranks the database records. In another embodiment, a sensitivity level tunes aggressiveness of the IPS as a whole. In still another embodiment, selective scanning enabled and disabled, either automatically or by manually by a network administrator. Further embodiments of the network gateway are set forth below with respect to FIG. 2.

In FIG. 3, diagrams 310 and 320 show the efficiency/coverage gained by the network gateway 110 using EPSS as opposed to CVSS in the context of vulnerability management. The diagram indicates that CVSS9+ provides a coverage of 25%, meaning that 25% of the exploited vulnerabilities are fixed if CVSS9+ criteria are used. However, only 9% of those vulnerabilities were actually exploited. Using EPSS for the same coverage rate of 25%, about 40% of those vulnerabilities were actually exploited. For CVSS9+ the False Positive rate is about 81% as opposed to 40% for EPSS.

The station 130 communicates with different resources on the data communication network 199, resulting in incoming data packets that need to be scanned for exploit signatures prior to forwarding to the station 130. Outgoing data packets can also be checked for exploit signatures.

In one embodiment, the access point 130 provides access for the station 130 communications over the data communication network 199. Exploit signature scanning in some embodiments is performed by the access point 120 either alone, or in conjunction with the network gateway 110.

FIG. 2 is a more detailed block diagram illustrating the network gateway 110 of the file sharing system of FIG. 1, according to an embodiment. The network gateway 110 includes an exploit signature database 210, a sensitivity threshold module 220, a vulnerability assessment module 230, an AI module 240, an intrusion prevention module 250, and a security action module 260. The modules can be implemented in source code stored in non-transitory memory executed by a processor. Alternatively, the modules can be implemented in hardware with microcode. The modules can be singular or representative of functionality spread over multiple components. Many other variations are possible. For example, other security policies addressing threats other than exploit signatures The exploit signature database 210 stores a plurality of exploit signatures. A prepackaged library of known malicious exploit signatures can be provided at deployment. One library includes all CVEs or all CVEs for a context (e.g., library versus bank). Signature updates are received at different times and added to the library. In one embodiment, the exploit signature database 210 operates in cooperation with an online resource during real-time scanning of data packets.

The sensitivity threshold module 220 assigns threat sensitivity levels for the plurality of signatures based on a use context of the private network. This is a high-level setting that can affect the entire signature database, or a subset thereof (e.g., sensitive packet sessions affected). As a result, while the exploit probability values define relationships between attributes, sensitivity levels define attribute affect as a whole or sub whole.

The vulnerability assessment module 230 identifies attributes of network devices on a private network, and to identify vulnerabilities associated with the attributes. The data scan already be available from earlier configurations. Also, the data can be actively collected from a central network component such as a network gateway or Wi-Fi controller. For example, pings or interrogations sent to an access point can discover an OS, an OS version, and other specifications. Some Wi-Fi controllers hold deeper information about each station from historical connections at different access points over time.

The AI module 240 can determine an exploit probability value for each of the plurality of signatures learned from a history of exploits against the attributes. The exploit probability value represents a likelihood of a particular signature exploiting one or more attributes of the private network. For training the AI module 240, a database of past exploits can be collected from local resources and from centralized cloud resources can be collected. Subsequent tuning of the AI module 240 can be based on later data updates.

The intrusion prevention module 250 can scan real-time network packets received from the data communication network prior to forwarding to a particular network device on the private network, for comparing network packets against signatures of the signature database. In an embodiment, the intrusion prevention module 250 avoids blocking certain network packets. In a second embodiment, the intrusion prevention module 250 that may exploit a vulnerability of an attribute based on the exploit probability value and the sensitivity level being below the threshold. An alternative embodiment continues to scan one or more bypassed data packets, with lower exploit probability values, at a later time when processing loads are lower.

The security action module 260 scans for selected exploit signatures. Prioritization reduces the amount of real-time comparisons required for each data packet and thus speeds processing. In one instance, the security action module 260 actively blocks traffic related to selected exploit signatures based on prioritization. In another instance, only the selected exploit signatures are logged to save log memory and volume.

II. Methods for Intrusion Detection (FIGS. 4-5)

Figure 4:
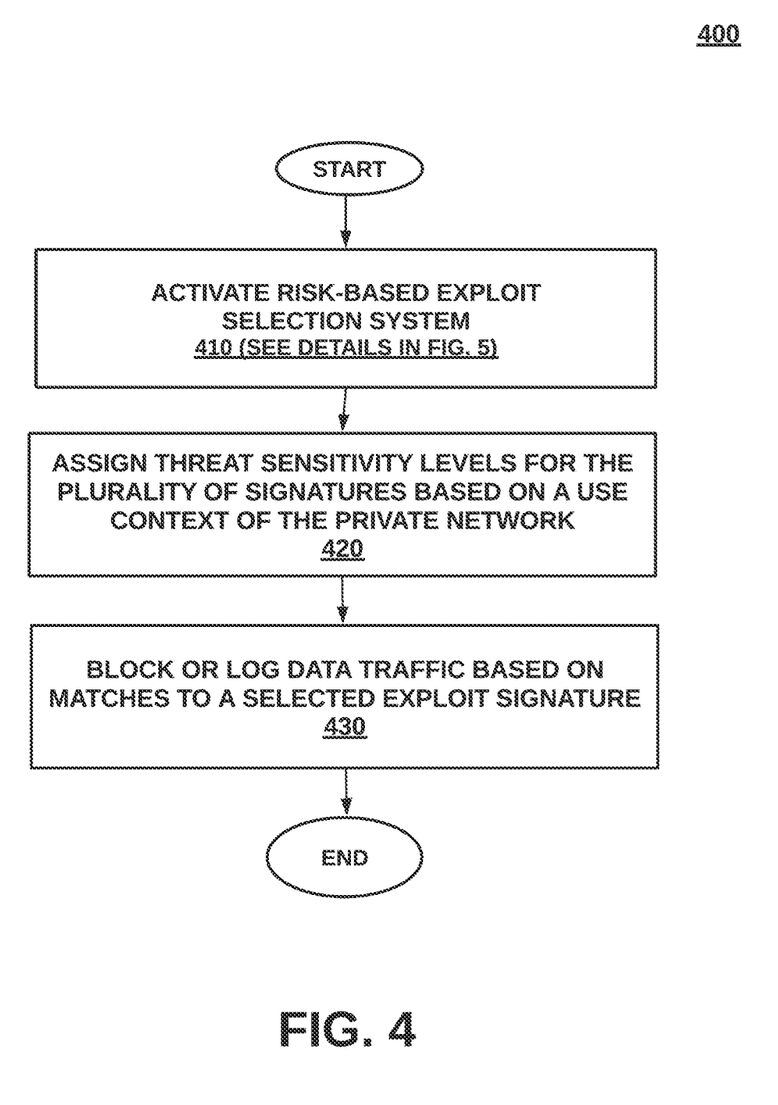
FIG. 4 is a high-level flow diagram illustrating a method for intrusion prevention with risk-based selection of exploit signature based on a vulnerability assessment of a private network, according to one preferred embodiment.

FIG. 4 is a high-level flow diagram illustrating a method for intrusion prevention with risk-based selection of exploit signature based on a vulnerability assessment of a private network, according to an embodiment. The method 400 can be implemented, for example, by the system 100. The steps are merely representative groupings of functionality, as there can be more or fewer steps, and the steps can be performed in different orders. Many other variations of the method 400 are possible.

Figure 5:
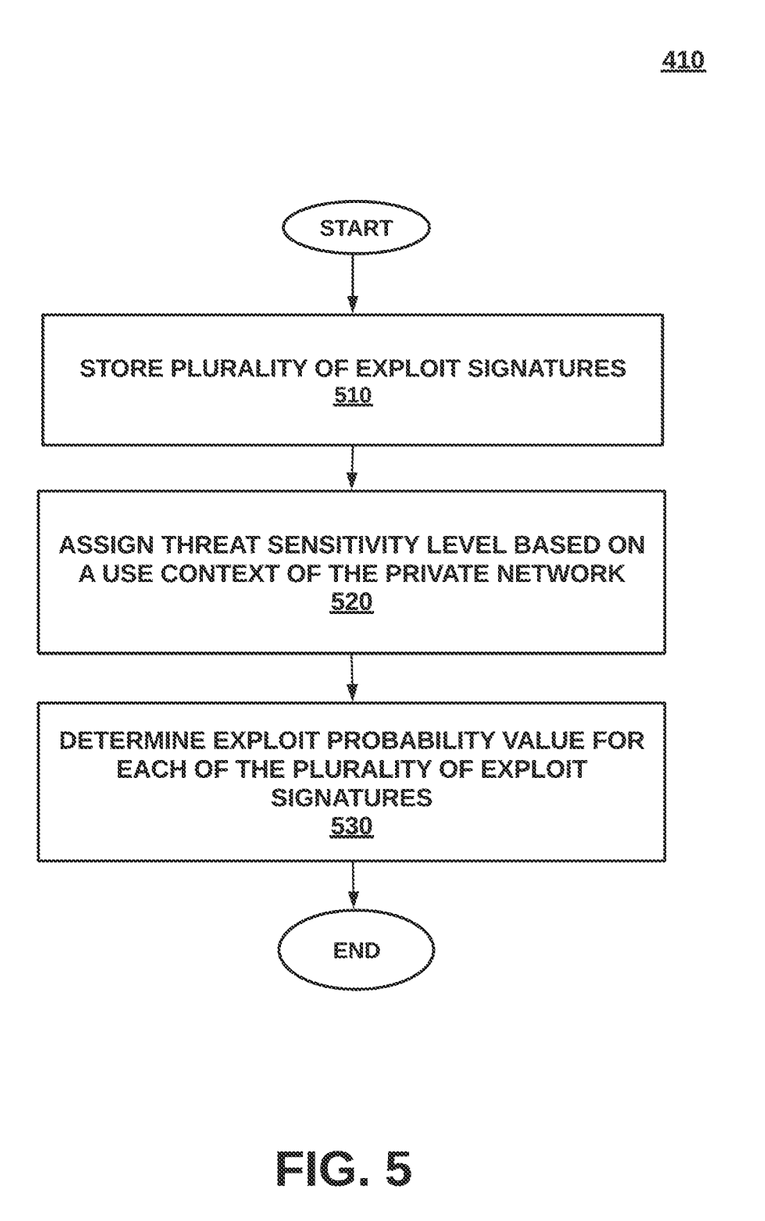
FIG. 5 is a more detailed flow diagram illustrating a step of initiating and configuring exploit probability signature scanning, for the method of FIG. 4, according to one embodiment.

At step 410, a risk-based exploit selection system is activated, as shown in detail in FIG. 5. At step 510, a plurality of exploit signatures is stored. In some embodiments, the system can also be deactivated disabled. At step 520, threat sensitivity levels are assigned for the plurality of signatures based on a use context of the private network. At step 530, attributes of network devices on a private network are identified, and vulnerabilities associated with the attributes are identified. At step 540, an exploit probability value is determined for each of the plurality of signatures learned from a history of exploits against attributes. The exploit probability value represents a likelihood of a particular signature exploiting one or more attributes of the private network.

At step 420, real-time network packets received from the data communication network are scanned prior to forwarding to a particular network device on the private network, for comparing network packets against signatures of the signature database.

At step 430, data traffic is blocked (or logged) based on matches to a selected exploit. The intrusion prevention module avoids blocking network packets that may exploit a vulnerability of an attribute based on the exploit probability value and/or the sensitivity level of an actual occurrence being below the threshold. Unblocked potential exploits can be flagged and prioritized in a log.

III. Generic Computing Environment (FIG. 6)

Figure 6:
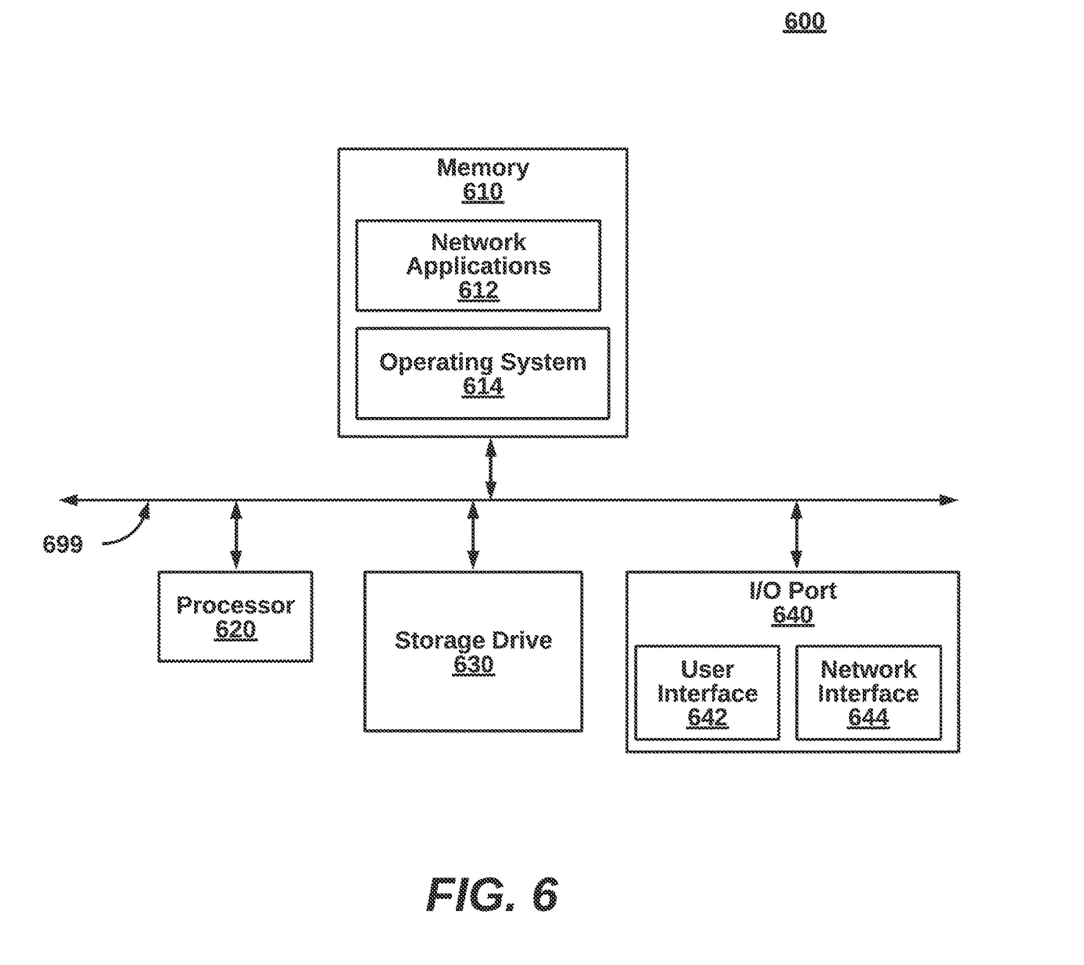
FIG. 6 is a high-level block diagram illustrating a computing device as an example hardware implementation of network devices herein, according to an embodiment.

FIG. 6 is a block diagram illustrating a computing device 600 capable of implementing components of the system, according to an embodiment. The computing device 600 of the present embodiment, includes a memory 610, a processor 620, a storage drive 630, and an I/O port 640. Each of the components is coupled for electronic communication via a bus 699. Communication can be digital and/or analog and use any suitable protocol. The computing device 600 can be any of components of the system 100 (e.g., network gateway 110, access point 120, and station 130), other networking devices (e.g., an access point, a firewall device, a gateway, a router, or a wireless station), or a disconnected device.

Network applications 612 can be network browsers, daemons communicating with other network devices, network protocol software, and the like. An operating system 614 within the computing device 600 executes software, processes. Standard components of the real OS environment 614 include an API module, a process list, a hardware information module, a firmware information module, and a file system. The operating system 614 can be FORTIOS, one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g., an RF antennae) connects to a medium such as Ethernet or Wi-Fi for data input and output. Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A network gateway device communicatively coupled to a data communication network, for intrusion prevention with risk-based selection of exploit signature based on a vulnerability assessment of a private network, the gateway device comprising:
   a processor;
   a network interface communicatively coupled to the processor and communicatively coupled to exchange data packets over the data communication network; and
   a memory communicatively coupled to the processor and storing:
      an exploit signature database to store a plurality of exploit signatures;
      a threshold module to assign threat sensitivity levels for the plurality of signatures based on a use context of the private network;
      a vulnerability assessment module to identify attributes of network devices on a private network, and to identify vulnerabilities associated with the attributes;
      an AI module to determine an exploit probability value for each of the plurality of signatures learned from a history of exploits against attributes, wherein the exploit probability value represents a likelihood of a particular signature exploiting one or more attributes of the private network that are determined to be vulnerable to the specific signature;
      an intrusion prevention module to scan real-time network packets received from the data communication network prior to forwarding to a particular network device on the private network, for comparing network packets against signatures of the signature database, wherein the intrusion prevention module avoids blocking network packets that are able to exploit a vulnerability of an attribute, based on the exploit probability value and the sensitivity level being below the threshold; and
      a security action module to flag and prioritize actions against potential exploits, wherein prioritizing is based on the exploit probability value and the sensitivity level being above the threshold for the particular signature.

2. The network gateway of claim 1, wherein the threat sensitivity level is set by user input.

3. The network gateway of claim 1, wherein the use context of the private network comprises at least one of: corporate office, outdoor environment, financial institution, governmental institution, educational institution, and a residence.

4. A method in a network gateway device communicatively coupled to a data communication network, for intrusion prevention with risk-based selection of exploit signature based on a vulnerability assessment of a private network, the method comprising the steps of:
   storing a plurality of exploit signatures in an exploit signature database;
   set a threat sensitivity level for each of the plurality of exploit signatures based on a use context of the private network;
   identifying attributes of network devices on a private network;
   identify vulnerabilities associated with the attributes;
   determining an exploit probability value for each of the plurality of signatures learned from a history of exploits against attributes, wherein the exploit probability value represents a likelihood of a particular signature exploiting one or more attributes of the private network that are determined to be vulnerable to the specific signature;
   scanning real-time network packets received from the data communication network prior to forwarding to a particular network device on the private network, for comparing network packets against signatures of the signature database, wherein the intrusion prevention module avoids blocking network packets that are able to exploit a vulnerability of an attribute based on the exploit probability value and the sensitivity level being below the threshold; and
   prioritizing security actions against potential exploits, wherein prioritizing is based on the exploit probability value and the sensitivity level being above the threshold, for the particular signature.

5. A non-transitory computer-readable media in a network gateway device communicatively coupled to a data communication network, for intrusion prevention with risk-based selection of exploit signature based on a vulnerability assessment of a private network controller, the method comprising the steps of:
   storing a plurality of exploit signatures in an exploit signature database;
   set a threat sensitivity level for each of the plurality of exploit signatures based on a use context of the private network;
   identifying attributes of network devices on a private network;
   identify vulnerabilities associated with the attributes;
   determining an exploit probability value for each of the plurality of signatures learned from a history of exploits against attributes, wherein the exploit probability value represents a likelihood of a particular signature exploiting one or more attributes of the private network that are determined to be vulnerable to the specific signature;
   scanning real-time network packets received from the data communication network prior to forwarding to a particular network device on the private network, for comparing network packets against signatures of the signature database, wherein the intrusion prevention module avoids blocking network packets that are able to exploit a vulnerability of an attribute based on the exploit probability value and the sensitivity level being below the threshold; and
   prioritizing security actions against potential exploits, wherein prioritizing is based on the exploit probability value and the sensitivity level being above the threshold, for the particular signature.

* * * * *